(12) United States Patent
Shi et al.

(10) Patent No.: US 10,251,189 B2
(45) Date of Patent: Apr. 2, 2019

(54) METHOD AND APPARATUS FOR COORDINATING RESOURCES AMONG DIFFERENT NETWORKS

(71) Applicant: Telefonakiebolaget LM Ericsson (publ), Stockholm (SE)

(72) Inventors: Cong Shi, Beijing (CN); Tim Irnich, Neuss (DE); Gen Li, Beijing (CN); Zhang Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 4 days.

(21) Appl. No.: 15/528,292

(22) PCT Filed: Nov. 28, 2014

(86) PCT No.: PCT/CN2014/092566
§ 371 (c)(1),
(2) Date: May 19, 2017

(87) PCT Pub. No.: WO2016/082214
PCT Pub. Date: Jun. 2, 2016

(65) Prior Publication Data
US 2017/0318600 A1 Nov. 2, 2017

(51) Int. Cl.
*H04W 4/00* (2018.01)
*H04W 72/12* (2009.01)

(52) U.S. Cl.
CPC .... *H04W 72/1215* (2013.01); *H04W 72/1278* (2013.01)

(58) Field of Classification Search
CPC ......... H04W 72/1278; H04W 72/1215; H04W 72/12
See application file for complete search history.

(56) References Cited

U.S. PATENT DOCUMENTS

2012/0157082 A1* 6/2012 Pedersen ............... H04W 24/10
455/422.1
2012/0243488 A1 9/2012 Gupta et al.
(Continued)

FOREIGN PATENT DOCUMENTS

CN 103222324 A 7/2013
EP 2 916 584 A1 9/2015
(Continued)

OTHER PUBLICATIONS

3GPP TSG RAN WG3 #70 Meeting, R3-103555, Nov. 15-19, 2010.*
(Continued)

*Primary Examiner* — Yemane Mesfin
*Assistant Examiner* — Abdelillah Elmejjarmi
(74) *Attorney, Agent, or Firm* — Sage Patent Group

(57) ABSTRACT

Embodiments of the present disclosure provide a method at a central coordination node for coordinating resources among a plurality of operating networks that is communicatively connected to the central coordination node. The method comprises receiving blanking determination related information reported from the plurality of operating networks and determining a blanking pattern for at least one of the plurality of operating networks based at least on the blanking determination related information. The method also comprises distributing the blanking pattern to the at least one of the plurality of operating networks.

15 Claims, 11 Drawing Sheets

(56) References Cited

U.S. PATENT DOCUMENTS

2013/0272274 A1* 10/2013 Ishida ................. H04W 72/082
                                                              370/336
2014/0148181 A1   5/2014 Lee et al.
2015/0289263 A1* 10/2015 Ohta ..................... H04W 16/04
                                                              370/329

FOREIGN PATENT DOCUMENTS

WO       2013 045981 A1    4/2013
WO       2014 079049 A1    5/2014

OTHER PUBLICATIONS

Supplementary European Search Report for Application No./Patent No. 14907193.8-1215 / 3225067—Jun. 4, 2018.
3GPP TSG RAN WG3 #70 Meeting; Jacksonville, U.S.; Source: Alcatel-Lucent Shanghai Bell, Alcatel-Lucent; Title: Almost Blank Subframe Request from Pico to Macro eNB (R3-103336)—Nov. 15-19, 2010.
PCT International Search Report for International application No. PCT/CN2014/092566—Sep. 6, 2015.

* cited by examiner

| Network | 1 | 2 | 3 |
|---|---|---|---|
| 1 | BRB₁ | BRR₍₁,₂₎ | BRR₍₁,₃₎ |
| 2 | BRR₍₂,₁₎ | BRB₂ | BRR₍₂,₃₎ |
| 3 | BRR₍₃,₁₎ | BRR₍₃,₂₎ | BRB₃ |

Table 1

| Network | 1 | 2 | 3 |
|---|---|---|---|
| 1 | 10% | 15% | 12% |
| 2 | 20% | 15% | 10% |
| 3 | 15% | 20% | 2% |

Table 2

| Network | 1 | 2 | 3 |
|---|---|---|---|
| 1 | 10% | 15% | 12% |
| 2 | 20% | 15% | 10% |
| 3 | 15% | 20% | 10% |

Table 3

| Network | 1 | 2 | 3 |
|---|---|---|---|
| 1 | 20% | 15% | 10% |
| 2 | 20% | 20% | 10% |
| 3 | 15% | 20% | 10% |

Table 4

| Network | 1 | 2 | 3 |
|---|---|---|---|
| FBR | 20% | 20% | 10% |
| ABR | 12% | 16% | 18% |

METHOD AND APPARATUS FOR COORDINATING RESOURCES AMONG DIFFERENT NETWORKS

PRIORITY

This nonprovisional application is a U.S. National Stage Filing under 35 U.S.C. § 371 of International Patent Application Serial No. PCT/CN2014/092566 filed Nov. 28, 2014, and entitled "Method And Apparatus For Coordinating Resources Among Different Networks."

TECHNICAL FIELD

The non-limiting and exemplary embodiments of the present disclosure generally relate to the technical field of wireless communications, and specifically to a method and apparatus for coordinating resources among different networks, particularly for millimeter-wave MMW networks.

BACKGROUND

This section introduces aspects that may facilitate a better understanding of the disclosure. Accordingly, the statements of this section are to be read in this light and are not to be understood as admissions about what is in the prior art or what is not in the prior art.

Mobile broadband continues to drive a demand for higher overall traffic capacity and a higher achievable end-user data rate in a radio access network. Several application scenarios in the future will require data rates up to 10 Gbps in local areas. The demand for very high system capacity and very high end-user date rates may be met by networks in which a distance between access nodes ranges from a few meters in indoor deployments up to roughly 50 m in outdoor deployments, i.e. with an infra-structure density considerably higher than the densest networks of today. The wide transmission bandwidth required for providing a data rate up to 10 Gbps and above may only be obtained from spectrum allocations in the millimeter-wave band. High-gain beamforming, typically realized with array antennas, may be used to mitigate the increased path loss at higher frequencies.

MMW networks have a number of properties that, generally speaking, make operations under the shared spectrum promising. Due to a small antenna size at higher frequencies, MMW networks heavily rely on the high-gain beamforming, which enables significantly higher resource reuse and alleviates interference between multiple networks. It is expected that these networks will predominantly be deployed in the form of "high-capacity coverage islands" in areas where a very high traffic demand is expected or a very high connection speed is required. This suggests that an area will normally be covered by one network only rather than having multiple parallel networks deployed by different operators that cover the same area. Hence, inter-network interference may predominantly occur between partially overlapping, adjacent or neighboring (i.e. with a certain distance in-between) networks. In such a situation, it is preferable to avoid fragmentation of the available bandwidth into one exclusive sub-band per network, since a large amount of spectrum would remain unused at times when networks are not simultaneously fully loaded, and peak data rates would be limited to a fraction of what could theoretically be achieved. It would instead be preferable that each MMW network may access the full available frequency bandwidth in order to maximize spectrum utilization and support peak data rates. In this case, inter-network interference may be unavoidable.

FIG. 1 illustrates a scenario of inter-network interference between two operating networks, e.g. two MMW networks, sharing a same spectrum, wherein a first operating network shown with a dotted pattern comprises three access nodes AN1-AN3 that serve user equipment UE1-UE3, respectively and a second operating network shown with a striped pattern also comprises three access nodes AN4-AN6 that serve UE4-UE6. The two operating networks are located in the same area and operate on the same spectrum. Hence they may cause interference to each other. The interference between links in different networks may be bidirectional or uni-directional. For example, link A1 between AN1 and UE1 in the first operating network may cause interference to link B1 between AN5 and UE5 in the second operating network, which is illustrated with a single head arrow; and link A2 between AN2 and UE2 in the first operating network may cause interference to link B2 between AN6 and UE6 in the second operating network and vice versa, which is illustrated with a double head arrow.

In this case, there is a need for a technology that may efficiently handle residual interference in border areas between two independent MMW networks. A solution of such kind of technology is interference coordination, which may coordinate scheduling of interfering links between different MMW networks so that interfering transmissions do not or at least less probably end up on the same radio resource.

FIG. 2 illustrates two different topologies for implementing resource coordination in the prior art, i.e. a centralized coordination topology and a distributed coordination topology.

In a centralized topology as illustrated in FIG. 2 (a), all information on resource usage of networks A, B and C may be collected by a central coordination function, which then makes a final decision on coordinated resource usage for multiple connected operating networks, e.g. MMW networks. In a distributed topology as illustrated in FIG. 2(b), two neighboring networks, e.g. networks A and B, may exchange information and negotiate with each other to determine the coordinated resource usage.

A patent application with No. PCT/CN2014/084640 has proposed a solution for coordinating resources in the distributed topology. The basic idea of this proposed solution is that only one network-wide blanking pattern is negotiated between involved operating networks for each of them as illustrated in FIG. 3. The blanking pattern divides the available radio resources into "blanking parts" as illustrated with white blocks in FIG. 3 and "usable parts" as illustrated with black blocks in FIG. 3. The coordinated blanking pattern may be applied in different levels, e.g. for the whole operating network (i.e. all links in the operating network are subject to blanking irrespective of whether they interfere or are interfered or not), for all links operated by a particular node in the operating network, some of which suffer from or cause interference, or for specific links operated by the particular node that suffer from or cause interference.

In this solution, either operating network involved in the negotiation is allocated a blanking pattern with a same blanking ratio for every round of coordination in order to main fairness between networks. As a result, each operating network has the same amount of resources available for scheduling, which is absolutely fair and thus may be easily accepted by both networks. This solution has offered several advantages like flexibility, timeliness, and absolute fairness in coordinating resources between operating networks.

There is also a need for a solution of coordinating resources in the centralized topology.

SUMMARY

Various embodiments of the present disclosure aim at providing a method and apparatus for coordinating resources in the centralized topology so as at least to more efficiently utilize valuable resources and guarantee long-term fairness for operating networks subject to the coordination. Other features and advantages of embodiments of the present disclosure will also be understood from the following description of specific embodiments when read in conjunction with the accompanying drawings, which illustrate, by way of example, the principles of embodiments of the present disclosure.

In a first aspect of the disclosure, there is provided a method at a central coordination node for coordinating resources among a plurality of operating networks that is communicatively connected to the central coordination node. The method comprises receiving blanking determination related information reported from the plurality of operating networks and determining a blanking pattern for at least one of the plurality of operating networks based at least on the blanking determination related information. The method also comprises distributing the blanking pattern to the at least one of the plurality of operating networks.

In one embodiment, said determining a blanking pattern may comprise determining a blanking ratio and blanking positions for the blanking pattern.

In another embodiment, said blanking determination related information may comprise a blanking ratio budget estimated at an operating network and one or more blanking ratio requests estimated by the operating network for one or more peer operating networks that interfere with that operating network.

In yet another embodiment, said determining a blanking ratio may comprise: for an operating network, determining the blanking ratio based on a comparison between its estimated blanking ratio budget and one or more blanking ratio requests estimated for it.

In yet another embodiment, said determining the blanking ratio based on the comparison may further comprise: for an operating network, if its estimated blanking ratio budget is not less than any of the blanking ratio requests estimated for it, then determining a maximum one of the blanking ratio requests estimated for it as the blanking ratio of that operating network; or for an operating network, if any of the blanking ratio requests reported for it is greater than its estimated blanking ratio budget, then adjusting at least one of that greater blanking ratio request and the estimated blanking ratio budget such that no blanking ratio request is greater than the estimated blanking ratio budget after the adjusting.

In yet another embodiment, wherein said adjusting may comprise adjusting at least one of the estimated blanking ratio budget and the greater blanking ratio request, based on a comparison between an average blanking ratio over a previous certain time period of the operating network that reports the greater blanking ratio request and an average blanking ratio over the previous certain time period of the operating network that has the estimated blanking ratio budget less than the greater blanking ratio request.

In yet another embodiment, said adjusting may further comprise, if the average blanking ratio of the operating network that reports the greater blanking ratio request is greater than the average blanking ratio of the operating network that has the estimated blanking ratio budget less than the greater blanking ratio request, then (1) increasing the estimated blanking ratio budget to the greater blanking ratio request; otherwise, decreasing the greater blanking ratio request to the estimated blanking ratio budget; or (2) adjusting both the greater blanking ratio request and the estimated blanking ratio budget to a value that is greater than an average of the greater blanking ratio request and the estimated blanking ratio budget and less than the greater blanking ratio request; otherwise adjusting both the greater blanking ratio request and the estimated blanking ratio budget to a value that is greater than the estimated blanking ratio budget and less than the average of the greater blanking ratio request and the estimated blanking ratio budget.

In yet another embodiment, the method may further comprise updating the average blanking ratios over a certain time period of the plurality of operating networks.

In yet another embodiment, said determining blanking positions may comprise at least causing blanking positions of two operating networks that interfere with each other to be different.

In yet another embodiment, the method may further comprise configuring one or more minimum blanking ratios for the plurality of operating networks.

In a second aspect of the present disclosure, there is provided a method in an operating network for resource coordination with a plurality of peer operating networks. The method comprises obtaining blanking determination related information and reporting the blanking determination related information to a central coordination node. The method also comprises scheduling the resources according to a blanking pattern distributed from the central coordination node that is determined based at least on the blanking determination related information.

In one embodiment, said obtaining blanking determination related information may comprise estimating a blanking ratio budget for the operating network and estimating one or more blanking ratio requests for the peer operating networks which are interfering with the operating network.

In another embodiment, said reporting the blanking determination related information may further comprise reporting the estimated blanking ratio budget along with an identification of the operating network and reporting the estimated one or more blanking ratio requests along with identifications of corresponding peer operating networks.

In yet another embodiment, said blanking determination related information may be obtained based at least on an operating condition of the operating network.

In a third aspect of the present disclosure, there is provided an apparatus in a central coordination node for coordinating resources among a plurality of operating networks that is communicatively connected to the central coordination node. The apparatus comprises a receiving module configured to receive blanking determination related information reported from the plurality of operating networks and a determining module configured to determine a blanking pattern for at least one of the plurality of operating networks based at least on the blanking determination related information. The apparatus also comprises a distributing module configured to distribute the blanking pattern to the at least one of the plurality of operating networks.

In a fourth aspect of the present disclosure, there is provided an apparatus in an operating network for resource coordination with a plurality of peer operating networks. The apparatus comprises an obtaining module configured to obtain blanking determination related information and a reporting module configured to report the blanking determination related information to a central coordination node. The apparatus also comprises a scheduling module configured to schedule the resources according to a blanking pattern distributed from the central coordination node that is determined based at least on the blanking determination related information.

In a fifth aspect of the present disclosure, there is provided an apparatus in a central coordination node for coordinating resources among a plurality of operating networks that is communicatively connected to the central coordination node. The apparatus comprises a processor and a memory, said memory containing instructions executable by said processor whereby said apparatus is operative to perform the method according to the first aspect of the present disclosure.

In a sixth aspect of the present disclosure, there is provided an apparatus in an operating network for resource coordination with a plurality of peer operating networks. The apparatus comprises a processor and a memory, said memory containing instructions executable by said processor whereby said apparatus is operative to perform the method according to the second aspect of the present disclosure.

In a seventh aspect of the present disclosure, there is provided an apparatus in a central coordination node for coordinating resources among a plurality of operating networks communicatively connected thereto. The apparatus comprises processing means adapted to perform the method according to the first aspect of the present disclosure.

In an eighth aspect of the present disclosure, there is provided an apparatus in an operating network for resource coordination with a plurality of peer operating networks. The apparatus comprises processing means adapted to perform the method according to the second aspect of the present disclosure.

In a ninth aspect of the present disclosure, there is provided a computer program, comprising instructions which, when executed on at least one processor, cause the at least one processor to perform the method according to the first aspect of the present disclosure.

In a tenth aspect of the present disclosure, there is provided a computer program, comprising instructions which, when executed on at least one processor, cause the at least one processor to perform the method according to the second aspect of the present disclosure.

According to the various aspects and embodiments as mentioned above, resources may be more effectively coordinated by a central coordination node among a plurality of operating networks, e.g. MMW networks that are communicatively connected to the central coordination node and meanwhile long-term fairness may be guaranteed for the plurality of operating networks.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 7 shows a specific example for illustrating the exemplary process of FIG. 6 according to the embodiment of the present disclosure;

DETAILED DESCRIPTION

Figure 1:
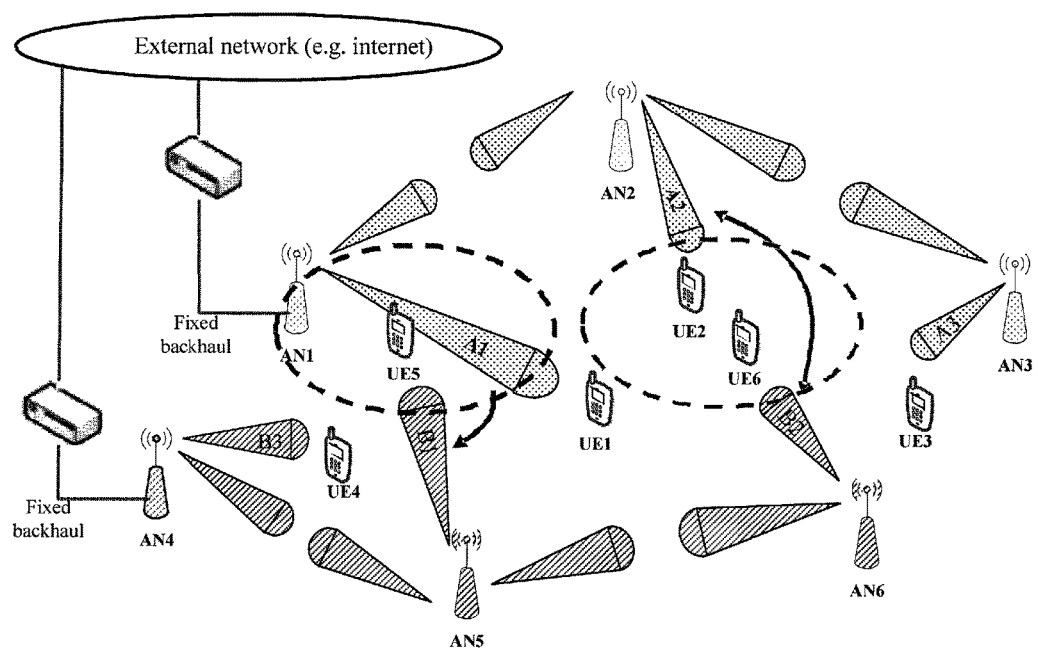
FIG. 1 illustrates a scenario of inter-network interference between two operating networks.

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs. For example, the term access node, AN, used herein may be referred to as e.g. eNB, eNodeB, NodeB, Base Station, Base Transceiver Station BTS or Access Point, depending on the technology and terminology to be used. The term "blanking pattern" used herein may specify how many resources and which resources need to be blanked out, which may be indicated by a "blanking ratio" and "blanking positions" respectively. The term "blanking ratio" used herein may refer to a ratio of resources to be blanked out to all available resources for an operating network. The term "blanking positions" may refer to positions of resources to be blanked out in the time domain and/or frequency domain, for example, which carrier(s) or subcarrier(s) or which subframe(s) or slot(s) needs to be blanked out. Also, the term "resources" or "radio resources" used herein may refer to time resources, frequency resources or both.

For illustrative purposes, several embodiments of the present disclosure will be described in the context of MMW networks. Those skilled in the art will appreciate, however, that the several embodiments of the present disclosure may be more generally applicable to other wireless networks.

The distributed characteristics of the distributed coordination topology makes it difficult to concurrently coordinate resources and meanwhile maintain long-term fairness among a plurality of operating networks, and thereby not possible to further improve spectrum efficiency. By contrast, a coordination function may be implemented at a central coordination node in the centralized coordination topology. Thus, it may be possible and reasonable for the central coordination node to obtain various information from a plurality of operating networks communicatively connected to it, and thereby concurrently coordinate resources among the plurality of operating networks with consideration of network conditions (e.g., a traffic load or channel environment etc.) and long-term fairness by storing historical coordination results for the plurality of operating networks. The long-term fairness sometimes may mean more efficient spectrum utilization. For example, in a case that network A has a low traffic load while network B has a high traffic load, if network A may blank more resources than network B, then higher spectrum efficiency can be achieved. In this case, network A may possibly accept the blanking pattern with a higher blanking ratio only when long-term fairness can be guaranteed. A person skilled in the art may understand that the "distributed" or "centralized" topology used herein may not be limited to the physically distributed or centralized topology, and also include the logically "distributed" or "centralized" topology.

Figure 2:
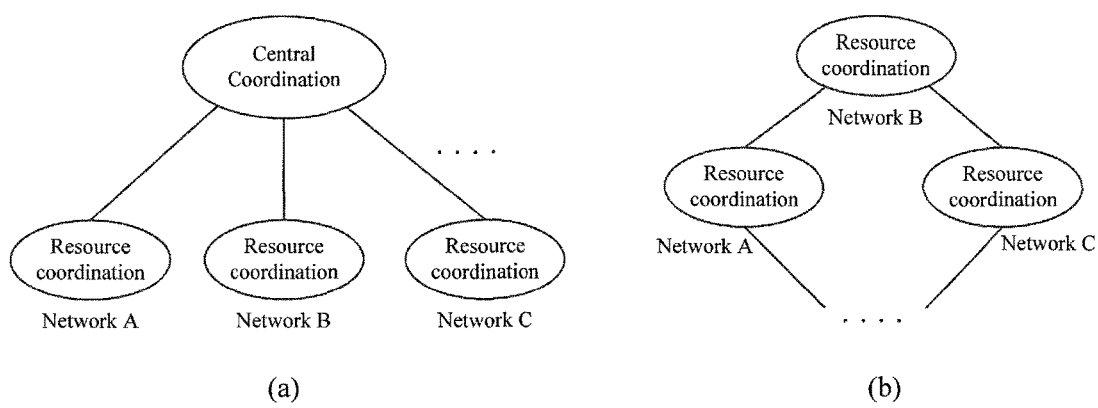
FIG. 2 illustrates two topologies for implementing resource coordination in the prior art.
Figure 3:
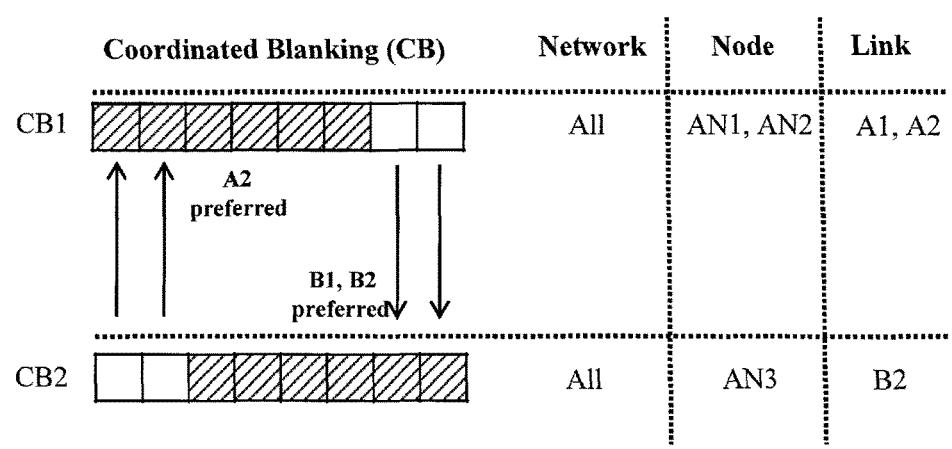
FIG. 3 illustrates coordinated blanking patterns and applications thereof in the existing solution.

In the following, various embodiments of the present disclosure will be described based on the centralized coordination topology as illustrated in FIG. 2 (a).

Figure 4:
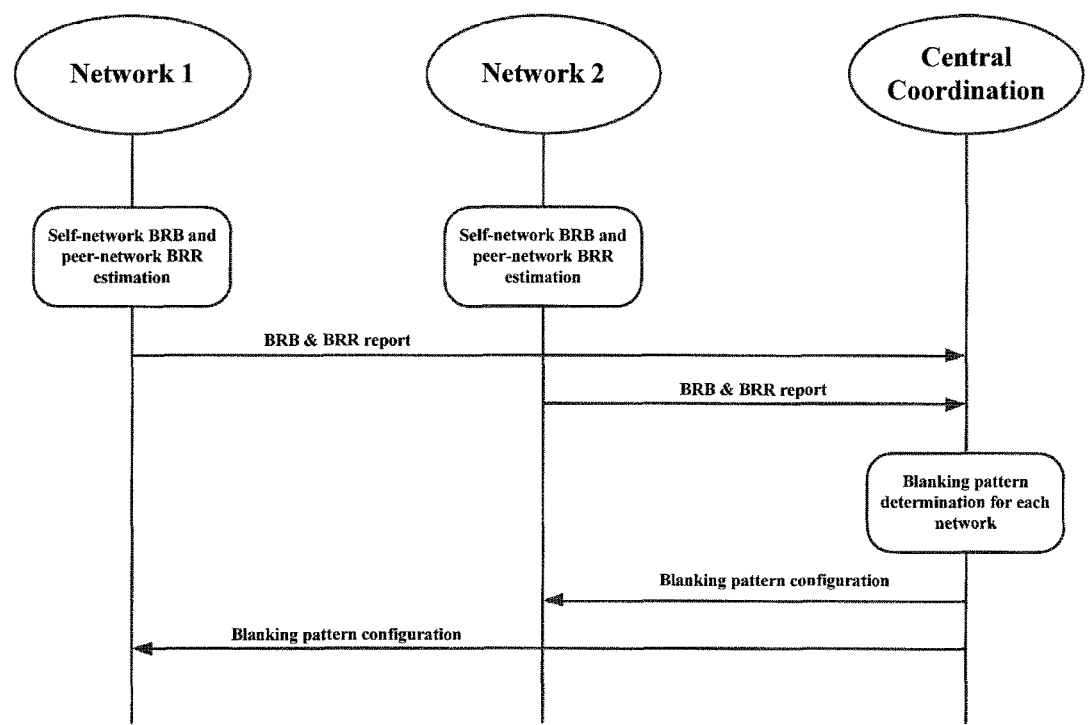
FIG. 4 is a schematic diagram illustrating a centralized coordination method according to embodiments of the present disclosure.

FIG. 4 is a schematic diagram illustrating a centralized coordination method according to embodiments of the present disclosure.

FIG. 4 exemplarily illustrates a central coordination node and two operating networks 1 and 2, for example MMW networks, (which may be simplified as "network" hereafter) that are communicatively connected to the central coordination node. The central coordination node is configured to coordinate radio resources between networks 1 and 2 that may interfere with each other. The central coordination node may be an entity located in a core network, in an operating network or independent of all the networks. A person skilled in the art may appreciate that the central coordination node may carry out coordination among more than two operating networks and the number of operating networks being coordinated is not limited to two.

As illustrated, each of networks 1 and 2 may firstly obtain blanking determination related information, for example by estimating a blanking ratio budget (BRB) for its own and also estimating a blanking ratio request (BRR) for the other network that may interfere with it. In a case that more than two networks exist, a network may be interfered by more than one other networks and thus need to estimate more than one BRRs for these interfering networks. Hereafter, one network in a plurality of networks connected to the same central coordination node is referred to a "peer" network of another network.

The BRB of a network used herein may be defined how many radio resources will be proposed by this network to be blanked out relative to all available resources. In one embodiment, one network may estimate its BRB according to its operating conditions, e.g. a traffic load and currently experienced interference etc. For example, a network may have information on a ratio of the radio resources that were not used in a previous time period to all available radio resources, e.g. 20%. Then this network may add a margin to this ratio and accordingly propose 15% as its BRB. In an embodiment that a minimum blanking ratio (MBR) is configured and communicated to each network by the central coordination node, the network may additionally consider the MBR when estimating its BRB. In various embodiments, a single MBR may be configured for all networks or alternatively a specific MBR may be configured for an individual network or for a set of several networks.

The BRR for a peer network used herein is defined as how many radio resources of this peer network are requested by another network to be blanked out relative to all available resources. In one embodiment, a network may estimate the BRR for each of its peer networks that may cause interference to it, e.g. according to operating conditions and measurement results. For example, a network may have a knowledge of which link is currently interfered by which network based on its own measurements, e.g. network 1 may know that its links (2, 3, 4) among total five links are interfered by network 2. Then, based on the coordinated blanking concept, these links (2, 3, 4) of network 1 may have to be scheduled only at blanked radio resources of network 2. Therefore, the traffic load on these interfered links may determine the expected blanking ratio for network 2. Accordingly, the average ratio of the resources occupied by these interfered links to all available resources may be used as the BRR estimated for network 2.

Once the blanking determination related information is obtained, e.g. the BRBs and BRRs are ready, networks 1 and 2 may report them to the central coordination node via wired or wireless communications by access nodes located in these networks, for example.

Upon reception of the blanking determination related information, e.g. BRBs and BRRs, the central coordination node initiates a procedure for determining a blanking pattern for at least one of the connected networks, preferably for each of the connected networks. The determination procedure may comprise a blanking ratio determination process and a blanking position determination process, which will be described respectively in the following.

In one embodiment, the central coordination node may maintain a blanking ratio determination decision table (which will be referred to as "decision table") for determining blanking ratios for the connected networks. The decision table may be a two-dimensional table, in which the first row and the first column contain identifications (IDs) of all the connected networks. Diagonal elements in the decision table may contain the BRB of each network; and non-diagonal elements may contain the BRR reported from a network corresponding to the ID in the first column or row to another network corresponding to the ID in the first row or column.

Figures 5, 6:
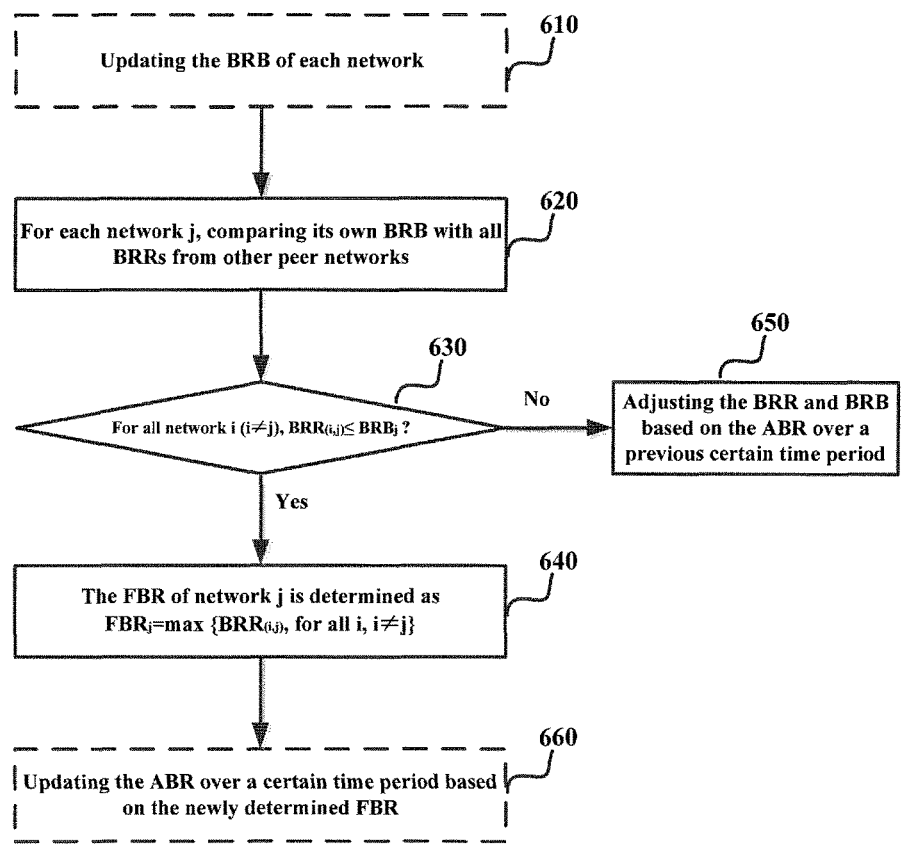
FIG. 5 illustrates an example of the decision table according to an embodiment of the present disclosure.
FIG. 6 illustrates an exemplary process 600 for calculating a final blanking ratio for each operating network based on the decision table according to an embodiment of the present disclosure.

FIG. 5 illustrates an example of the decision table according to an embodiment of the present disclosure. In this example, three networks with IDs 1, 2, 3 coexist. The three striped diagonal elements $BRB_i$ represent the blanking ratio budgets proposed respectively by the three networks, wherein the subscript i corresponds to the ID of the respective network. Other non-diagonal elements $BRR_{(i,j)}$ represent the blanking ratio requested by network with ID i (which will be referred to as "network i" hereafter) for network with ID j (which will be referred to as "network j" hereafter). For example, $BRB_1$ represents the blanking ratio budget proposed by network 1 and $BRR_{(2,1)}$ represent the blanking ratio requested by network 2 for network 1.

Based on the decision table, a final blanking ratio (FBR) for each network may be determined at the central coordination node. FIG. 6 illustrates an exemplary process 600 for determining the FBR for each network based on the decision table according to an embodiment of the present disclosure.

The basic idea of the exemplified determination is that for a network, if the BRRs from its peer networks are satisfied by this network, which means these BRRs are all less than the BRB of this network, the FBR of it may be decided as the maximum one of these BRRs; and if one or more of the BRRs from its peer networks could not be satisfied by this network, the one or more BRRs and/or BRB need to be adjusted. An approach for adjusting the BRRs and/or BRB may be implemented by comparing average blanking ratios (ABRs) over a previous certain period for related networks. For example, if the ABR for network A is greater than that of network B, it means that network A blanked out more radio resources than network B did in the previous certain period. Thus network A's blanking ratio request may have a higher priority to be satisfied than network B's blanking ratio budget. By this way, the long-term fairness may be guaranteed.

As illustrated in FIG. 6, at block 610, the BRBs maintained in the decision table may be updated first, if an MBR is configured for the connected networks but not communicated to them. For each network, the maximum of the configured MBR and BRB of it may be adopted as the updated BRB of that network.

At block 620, for each network with ID j in the decision table, each blanking ratio requested by network i, $BRR_{(i,j)}$ (i≠j), may be compared with its own blanking ratio budget $BRB_j$.

Then at block 630, for any network i (i≠j), whether its blanking ratio request is less than or equal to the blanking ratio budget of network j, i.e. $BRR_{(i,j)} \leq BRB_j$, may be determined. A person skilled in the art shall understand that the $BRR_{(i,j)}$ may equal to zero if network j causes no interference to network i or the interference caused by network j is less than a predetermined threshold so that the quality of service (QoS) of network i is not affected.

If the determination indicates $BRR_{(i,j)} \leq BRB_j$, then the final blanking ratio for network j, $FBR_j$ may be determined at block 640 as the maximum one of all $BRR_{(i,j)}$, which may be expressed as $FBR_j=\max\{BRR(i,j),$ for all i, i≠j$\}$; and if the determination at block 603 indicates that any BRR reported from network i is greater than the BRB of network j, i.e. $BRR_{(i,j)} > BRB_j$, then the process proceeds to block 650.

At block 650, at least one of $BRB_j$ and $BRR_{(i,j)}$ that is greater than $BRB_j$ may need to be adjusted based on respective average blanking ratios of networks i and j over a pervious certain time period, which may be defined respectively as $ABR_i^{n-1}$ and $ABR_j^{n-1}$, wherein n−1 represents that the blanking ratio was averaged over the previous certain time period. There are various ways to carry out this adjustment.

For example, if $ABR_i^{n-1} \geq ABR_j^{n-1}$, then $BRB_j$ may be increased to $BRR_{(i,j)}$ such that the adjusted blanking ratio budget, which will be denoted as $BRB_j'$, of network j may equal to the $BRR_{(i,j)}$ reported from network i; otherwise, $BRR_{(i,j)}$ may be decreased to $BRB_j$ such that the $BRB_j$ of network j may equals to the adjusted blanking ratio request from network i, which will be denoted as $BRR_{(i,j)}'$.

For another example, both $BRR_{(i,j)}$ and $BRB_j$ may be adjusted to some value k compliant with the following rule: if $ABR_i^{n-1} \geq ABR_j^{n-1}$, then the value k may be set as $(BRR_{(i,j)}+BRB_j)/2 < k < BRR_{(i,j)}$; otherwise the value k may be set as $BRB_j < k < (BRR_{(i,j)}+BRB_j)/2$.

After the adjustment, the process may return to block 630. The adjustment may be repeated until no blanking ratio requested for network j is greater than the blanking ratio budget of network j after the adjustment. Those skilled in the art may appreciate that other approaches for adjusting the BRB of a network and the BRR reported from another network may also be applicable and will fall within the scope of the present disclosure, as long as the adjusted BRB is not less than the BRR or the adjusted BRR, or the BRB is not less than the adjusted BRR.

Then at block 660, the average blanking ratio of network j over a current certain time period may be updated based on the newly calculated $FBR_j$. The operation at block 660 is optional and performed only when the blanking ratio of any network is changed relative to the value previously maintained in the decision table. The operation at block 660 may be alternatively performed at any time before or when the adjustment of block 650 is performed. Also, the current certain time period is preferably equal to the previous certain time period, which may alternatively be longer or shorter than the previous certain time period.

A person skilled in the art shall appreciate that the concept of the centralized coordination solution described with reference to FIG. 6 may also be applicable to an individual operating network, for example for coordinating resources among multiple ANs within the same network; and the centralized coordination method may also be implemented in an operating network in the distributed topology, as long as the operating network is capable of collecting blanking determination related information from multiple peer operating networks.

FIG. 7 shows a specific example for illustrating the exemplary process of FIG. 6 according to the embodiment of the present disclosure. The decision table used in FIG. 7 is referred to that as illustrated in FIG. 5 and corresponding values of respective elements, such as $BRR_{(i,j)}$ and $BRB_j$ are listed in Table 1 of FIG. 7. In this example, a single MBR is configured for all networks 1-3 as 10% and the ABRs over a previous certain time period for networks 1-3 are 10%, 5% and 20%, respectively.

According to the process as illustrated in FIG. 6, firstly the decision table is updated based on the configured MBR 10%. As shown in Table 2 of FIG. 7, only the BRB of network 3 needs to be updated to 10%.

Then, the BRB of each network is compared with corresponding BRRs reported from its peer networks. In this example, $BRB_1$ is less than both $BRR_{(2,1)}$ and $BRR_{(3,1)}$; $BRB_2$ is less than $BRR_{(3,2)}$; and $BRB_3$ is less than $BRR_{(1,3)}$. Accordingly, adjustment shall be performed with regard to these BRBs and/or BRRs. Table 3 of FIG. 7 shows one possible adjustment result, wherein $BRB_1$ and $BRB_2$ are increased to 20% and $BRR_{(1,3)}$ is decreased to 10%.

Afterwards, the FBRs of respective networks are obtained as 10%, 20%, and 10% at Table 4 of FIG. 7. The corresponding ABRs over the current certain time period are also updated as 12%, 16% and 18%.

According to the above, for each operating network, its actual blanking ratio may be determined according to its own proposal based on its operating conditions and other peer networks' requests with a consideration of historical blanking information of relative networks, therefore the long-term fairness may be guaranteed and meanwhile the radio resources may be more efficiently utilized.

Figure 8:
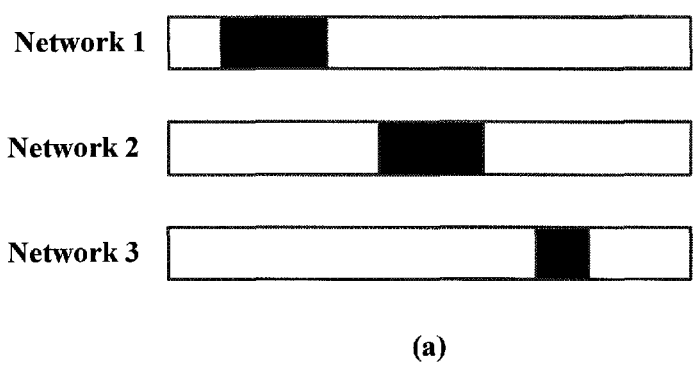
FIG. 8 illustrates two approaches for blanking position determination according to embodiments of the present disclosure.
Figure 8:
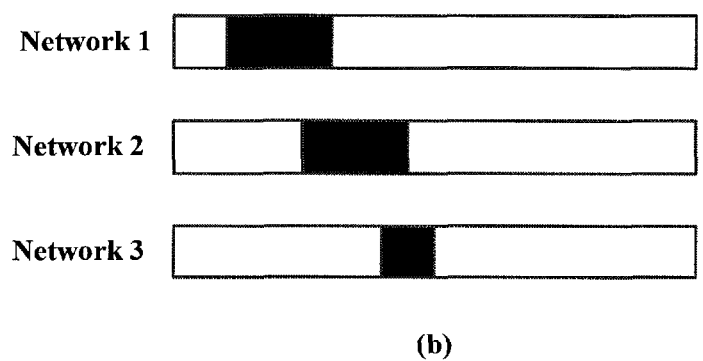

Once the blanking ratio is determined for each operating network, the blanking positions may also be coordinated among the relative operating networks. The term "relative" used herein refer to those operating networks that may interfere with each other. Again, there are various approaches for determining blanking positions for each operating network. FIG. 8 illustrates two approaches for the blanking position determination according to embodiments of the present disclosure.

In one embodiment, the blanking positions for all relative operating networks may be orthogonal, which means different operating networks shall be assigned totally different blanking positions in radio resources. Taking the radio resources in time domain as an example, in conjunction with the blanking ratios determined for networks 1-3 at Table 4 of FIG. 7, the final blanking patterns for these networks 1-3 may be determined as shown in FIG. 8(a), in which the "blanking parts" (which are denoted with black blocks) in respective blanking patterns for networks 1-3 are not overlapped.

In another embodiment, the blanking positions for two or more different networks may be overlapped. For example, when the two or more operating networks interfere with a same operating network in same radio resources, these radio resources may be blanked out for all of the two or more operating networks, resulting the overlapping of the blanking positions. Again, taking the radio resources in time domain as an example, in conjunction with the blanking ratios determined for networks 1-3 at Table 4 of FIG. 7, the final blanking patterns for these networks 1-3 may be determined as shown in FIG. 8(b), in which the "blanking parts" (which are denoted with black blocks) of networks 1 and 2 are partially overlapped and the "blanking parts" of networks 2 and 3 are partially overlapped.

Now reference is made back to FIG. 4. Once both the blanking ratio and the blanking positions are determined, which means the final blanking pattern for each operating network has been coordinated, then the central coordination node may distribute the final blanking patterns to the operating networks. In one embodiment, all or some of the final blanking patterns may be distributed to each operating network. Alternatively, for each operating network, only the blanking pattern determined for it may be distributed to that operating network.

Then, upon reception of the coordinated blanking pattern, the operating network may schedule resources according to the blanking pattern. For example, the coordinated blanking pattern may be applied in different levels, e.g. for the whole operating network (i.e. all links in the operating network are subject to blanking irrespective of whether they interfere or are interfered), for all links operated by a particular node in the operating network, some of which suffer from or cause interference, or for specific links operated by the particular node that suffer from or cause interference. Specific scheduling manners according to the blanking pattern may vary in various implementations depending on practical performance or quality of service (QoS) requirements, which have been known in previous works and will not be detailed in this disclosure.

Figure 9:
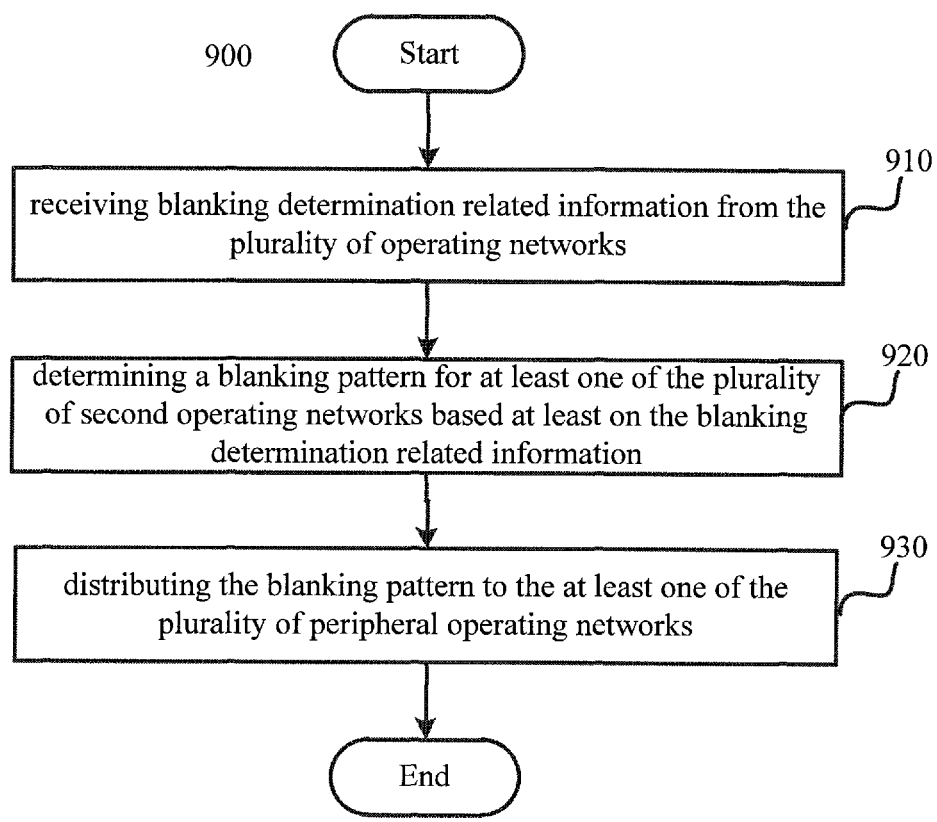
FIG. 9 illustrates a flowchart of a method 900 for coordinating resources among a plurality of operating networks communicatively connected to a central coordination node.

FIG. 9 illustrates a flowchart of a method 900 for coordinating resources among a plurality of operating networks, for example MMW networks, communicatively connected to a central coordination node. The method 900 is performed at the central coordination node, which may correspond to the central coordination node as illustrated in FIG. 4. A person skilled in the art shall appreciate that said plurality of operating networks may include some or all of operating networks connected to the central coordination node, regardless of whether these operating networks interfere with each other or not, or alternatively said plurality of operating networks may only include those that are interfering with each other.

As illustrated in FIG. 9, blanking determination related information reported from the plurality of operating networks is firstly received at block 910. For example, the blanking determination related information may be the aforesaid blanking ratio budget estimated at an operating network and one or more blanking ratio requests estimated by the operating network for one or more peer operating networks that interfere with that operating network.

Then at block 920, a blanking pattern of at least one of the plurality of operating networks is determined based at least on the blanking determination related information. In an embodiment, the determination of the blanking pattern may comprise determining a blanking ratio and blanking positions for the blanking pattern. The blanking ratio may be determined according to the exemplary process 600, for example.

In one embodiment, for an operating network, the blanking ratio may be determined based on a comparison between its estimated blanking ratio budget and one or more blanking ratio requests estimated for it. In some cases, if an operating network is not interfering with any other peer operating network or causing a low level interference that may not affect other peer networks' performance, then no blanking ratio requests for this network may be reported and thus the blanking ratio for this operating network may be 0 as a default value.

In another embodiment, for an operating network, if its estimated blanking ratio budget is not less than any of the blanking ratio requests estimated for it, then the maximum one of the blanking ratio requests estimated for it may be determined as the blanking ratio of that operating network. Alternatively, for an operating network, if any of the blanking ratio requests estimated for it is greater than its estimated blanking ratio budget, then at least one of that greater blanking ratio request and the estimated blanking ratio budget may be adjusted such that no blanking ratio request is greater than the estimated blanking ratio budget after the adjusting.

In a further embodiment, the at least one of the estimated blanking ratio budget and the greater blanking ratio request may be adjusted based on a comparison between an average blanking ratio over a previous certain time period of the operating network that reports the greater blanking ratio request and an average blanking ratio over the previous certain time period of the operating network that has the estimated blanking ratio budget less than the greater blanking ratio request.

In a further embodiment, if the average blanking ratio of the operating network that reports the greater blanking ratio request is greater than the average blanking ratio of the operating network that has the estimated blanking ratio budget less than the greater blanking ratio request, then (1) the estimated blanking ratio budget may be increased to the greater blanking ratio request; otherwise, decreasing the greater blanking ratio request to the estimated blanking ratio budget; or (2) both the greater blanking ratio request and the estimated blanking ratio budget may be adjusted to a value that is greater than an average of the greater blanking ratio request and the estimated blanking ratio budget and less than the greater blanking ratio request; otherwise both the greater blanking ratio request and the estimated blanking ratio budget to may be adjusted to a value that is greater than the estimated blanking ratio budget and less than the average of the greater blanking ratio request and the estimated blanking ratio budget.

More details and specific implementations for determining the blanking patterns of the operating networks may be referred to the descriptions with reference to FIGS. 5-8 and will not be detailed herein for the conciseness purpose.

Afterwards at block 930, the determined blanking pattern is distributed to the at least one of the plurality of operating networks. In one embodiment, blanking patterns may be determined for each of the plurality operating networks, and then as mentioned above, all or some of the determined blanking patterns may be sent to each of the plurality operating networks; or alternatively, for each operating network, only the blanking pattern determined for it may be sent.

Figure 10:
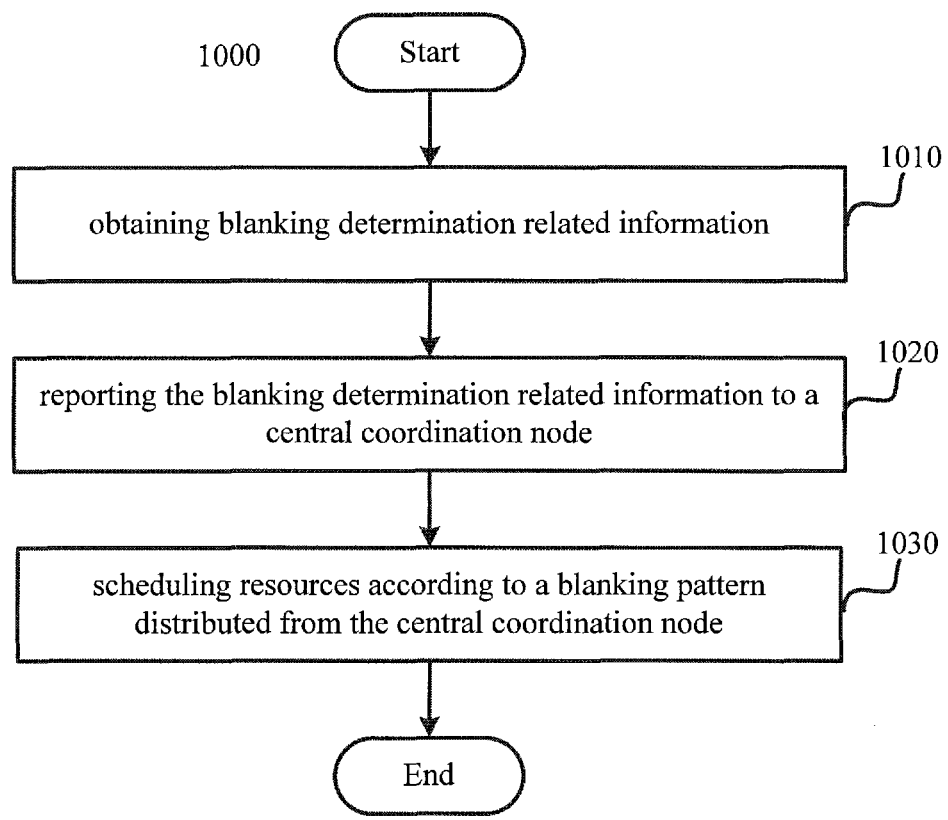
FIG. 10 illustrates a flowchart of a method 1000 in an operating network for resource coordination with a plurality of peer operating networks.

FIG. 10 illustrates a flowchart of a method 1000 in an operating network for resource coordination with a plurality of peer operating networks.

As illustrated, the method 1000 comprises, at block 1010, obtaining blanking determination related information. In one embodiment, the obtaining may at least comprise estimating a blanking ratio budget for the operating network and estimating one or more blanking ratio requests for one or more of the peer operating networks which are interfering with the operating network.

Then at block 1020, the blanking determination related information is reported to a central coordination node. In one embodiment, the estimated blanking ratio budget may be reported along with an identification of the operating network; and additionally, the estimated one or more blanking ratio requests may be reported along with identifications of corresponding peer operating networks.

According to the above description with reference to FIG. 9, the central coordination node will determine, based at least on the blanking determination related information, and distribute a blanking pattern for the operating network. Accordingly, the resources are scheduled at block 1030 in the operating network according to the blanking pattern distributed from the central coordination node.

Figure 11:
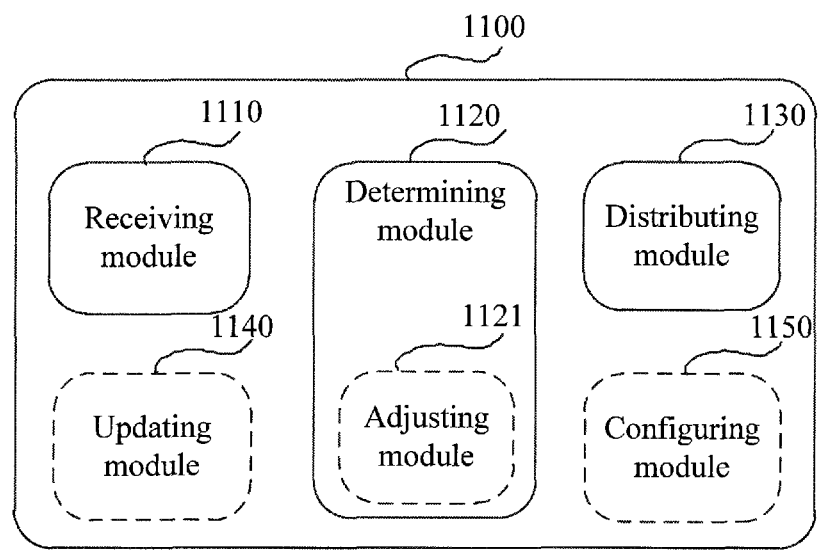
FIG. 11 illustrates a schematic block diagram of an apparatus 1100 adapted for coordinating resources among a plurality of operating networks according to an embodiment of the present disclosure.

FIG. 11 illustrates a schematic block diagram of an apparatus 1100 adapted for coordinating resources among a plurality of operating networks according to an embodiment of the present disclosure. The apparatus 1100 may be located at a central coordination node to which the plurality of operating networks is communicatively connected, as illustrated in FIG. 4 and perform the method 900 as described with reference to FIG. 9.

As illustrated in FIG. 11, the apparatus 1100 comprises a receiving module 1110 configured to receive blanking determination related information reported from the plurality of operating networks, a determining module 1120 configured to determine a blanking pattern for at least one of the plurality of operating networks based at least on the blanking determination related information, and a distributing module 1130 configured to distribute the blanking pattern to the at least one of the plurality of operating networks.

The determining module 1120 may further comprise an adjusting module 1121 that is configured to, for an operating network, if any of the blanking ratio requests reported for it is greater than its estimated blanking ratio budget, then adjust at least one of that greater blanking ratio request and the estimated blanking ratio budget such that no blanking ratio request is greater than the estimated blanking ratio budget after the adjusting.

The apparatus 1100 may further comprise an updating module (1140) configured to update the average blanking ratios over a certain time period of the plurality of operating networks.

The apparatus 1100 may further comprise a configuring module 1150 configured to configure one or more minimum blanking ratios for the plurality of operating networks.

The above modules may be configured to implement the corresponding operations or steps as described with reference to FIG. 9 and thus will not be detailed herein for the conciseness purpose.

Figure 12:
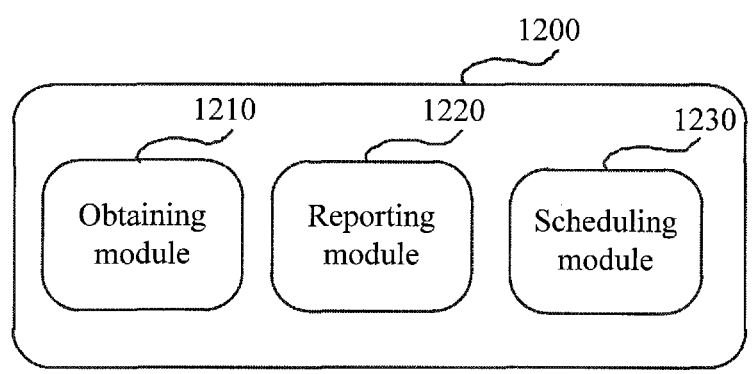
FIG. 12 illustrates a schematic block diagram of an apparatus 1200 in an operating network for resource coordination with a plurality of peer operating networks.

FIG. 12 illustrates a schematic block diagram of an apparatus 1200 in an operating network for resource coordination with a plurality of peer operating networks. The apparatus 1200 comprises an obtaining module 1210 configured to obtain blanking determination related information, a reporting module 1220 configured to report the blanking determination related information to a central coordination node, and a scheduling module 1230 configured to schedule the resources according to a blanking pattern distributed from the central coordination node that is determined based at least on the blanking determination related information.

In one embodiment, the obtaining module 1210 may be further configured to estimate a blanking ratio budget for the operating network and to estimate one or more blanking ratio requests for the peer operating networks which are interfering with the operating network, based at least on an operating condition of the operating network, for example a traffic load or currently experienced interference etc.

In another embodiment, the reporting module 1220 may be further configured to report the estimated blanking ratio budget along with an identification of the operating network;

and report the estimated one or more blanking ratio requests along with identifications of corresponding peer operating networks.

These modules may be configured to implement the corresponding operations or steps as described with reference to FIG. 10 and thus will not be detailed herein for the conciseness purpose.

Figure 13:
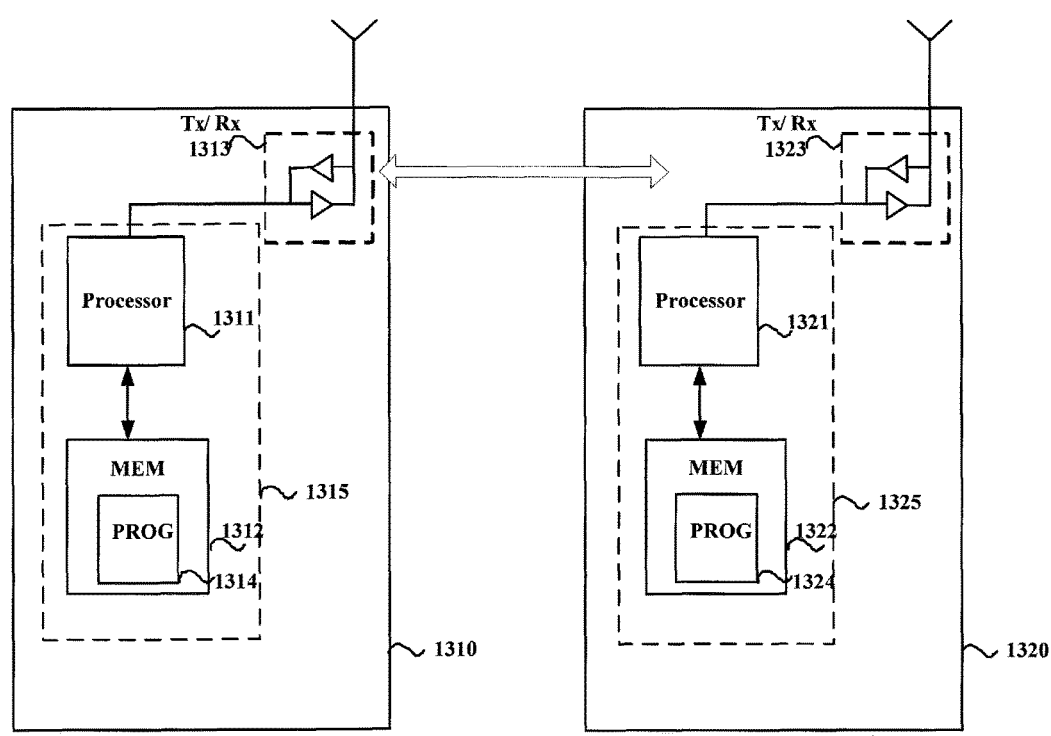
FIG. 13 illustrates a simplified block diagram of an apparatus 1310 and an apparatus 1320 that are suitable for coordinating resources among a plurality of operating networks according to embodiments of the present disclosure.

FIG. 13 illustrates a simplified block diagram of an apparatus 1310 and an apparatus 1320 that are suitable for coordinating resources among a plurality of operating networks according to embodiments of the present disclosure. The apparatus 1310 may be located at a central coordination node as illustrated in FIG. 4 and the apparatus 1320 may be located at one of a plurality of operating networks communicatively connected to the central coordination node.

The apparatus 1310 comprises at least one processor 1311, such as a data processor (DP) and at least one memory (MEM) 1312 coupled to the processor 1311. The apparatus 1310 may further comprise a transmitter TX and receiver RX 1313 coupled to the processor 1311, which may be a RF TX/RX comprising at least one antenna for wireless communications with other apparatuses, e.g. the apparatus 1320, or a TX/RX adapter for wired communications with the other apparatuses. The MEM 1312 stores a program (PROG) 1314. The PROG 1314 may include instructions that, when executed on the associated processor 1311, enable the apparatus 1310 to operate in accordance with the embodiments of the present disclosure, for example to perform the method 900. A combination of the at least one processor 1311 and the at least one MEM 1312 may form processing means 1315 adapted to implement various embodiments of the present disclosure.

The apparatus 1320 comprises at least one processor 1321, such as a DP, at least one MEM 1322 coupled to the processor 1321. The apparatus 1320 may further comprise a suitable TX/RX 123 coupled to the processor 1321, which may be a RF TX/RX comprising at least one antenna for wireless communications with other apparatuses, e.g. the apparatus 1310, or a TX/RX adapter for wired communications with the other apparatuses. The MEM 1322 stores a PROG 1324. The PROG 1324 may include instructions that, when executed on the associated processor 1321, enable the apparatus 1320 to operate in accordance with the embodiments of the present disclosure, for example to perform the method 1000. A combination of the at least one processor 1321 and the at least one MEM 1322 may form processing means 1325 adapted to implement various embodiments of the present disclosure.

Various embodiments of the present disclosure may be implemented by computer program executable by one or more of the processor 1311 and 1321, software, firmware, hardware or in a combination thereof.

The MEMs 1312 and 1322 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 1311 and 1321 may be of any type suitable to the local technical environment, and may include one or more of general purpose computers, special purpose computers, microprocessors, digital signal processors DSPs and processors based on multicore processor architecture, as non-limiting examples. Each of the apparatuses 1310 and 1320 may have multiple processors, such as an application specific integrated circuit ASIC chip that is slaved in time to a clock which synchronizes the main processor.

Although the above description is made in the context of MMW networks, it should not be construed as limiting the spirit and scope of the present disclosure. The idea and concept of the present disclosure can be generalized to also cover other wireless networks which might have an inter-network interference issue.

In addition, the present disclosure provides a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods, apparatuses, i.e. systems. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method at a central coordination node for coordinating resources among a plurality of operating networks that is communicatively connected to the central coordination node, comprising:
    receiving blanking determination related information reported from the plurality of operating networks;
    determining a blanking pattern for at least one of the plurality of operating networks based at least on the blanking determination related information; and
    distributing the blanking pattern to the at least one of the plurality of operating networks;
    wherein;
    determining a blanking pattern at least comprises determining a blanking ratio and blanking positions for the blanking pattern;
    the blanking determination related information at least comprises:
        a blanking ratio budget estimated at an operating network; and
        one or more blanking ratio requests estimated by the operating network for one or more peer operating networks that interfere with that operating network; and
    determining a blanking ratio comprises, for an operating network, determining the blanking ratio based on a comparison between its estimated blanking ratio budget and one or more blanking ratio requests estimated for the operating network by one or more of its peer operating networks.

2. The method according to claim 1, wherein said determining the blanking ratio based on the comparison further comprises:
    for an operating network, if its estimated blanking ratio budget is not less than any of the blanking ratio requests estimated for it, then determining a maximum one of the blanking ratio requests estimated for it as the blanking ratio of that operating network; or
    for an operating network, if any of the blanking ratio requests estimated for it is greater than its estimated blanking ratio budget, then adjusting at least one of that greater blanking ratio request and the estimated blanking ratio budget such that no blanking ratio request is greater than the estimated blanking ratio budget after the adjusting.

3. The method according to claim 2, wherein said adjusting comprises:
    adjusting at least one of the estimated blanking ratio budget and the greater blanking ratio request, based on a comparison between an average blanking ratio over a previous certain time period of the operating network that reports the greater blanking ratio request and an average blanking ratio over the previous certain time period of the operating network that has the estimated blanking ratio budget less than the greater blanking ratio request.

4. The method according to claim 2, wherein said adjusting further comprises:
    if the average blanking ratio of the operating network that reports the greater blanking ratio request is greater than the average blanking ratio of the operating network that has the estimated blanking ratio budget less than the greater blanking ratio request, then increasing the estimated blanking ratio budget to the greater blanking ratio request;
    otherwise, decreasing the greater blanking ratio request to the estimated blanking ratio budget; or
    adjusting both the greater blanking ratio request and the estimated blanking ratio budget to a value that is greater than an average of the greater blanking ratio request and the estimated blanking ratio budget and less than the greater blanking ratio request; otherwise adjusting both the greater blanking ratio request and the estimated blanking ratio budget to a value that is greater than the estimated blanking ratio budget and less than the average of the greater blanking ratio request and the estimated blanking ratio budget.

5. The method according to any of claim 1, said determining blanking positions comprises at least causing blanking positions of two operating networks that interfere with each other to be different.

6. The method according to any of claim 1, further comprising:
    configuring one or more minimum blanking ratios for the plurality of operating networks.

7. The method according to claim 1, further comprising:
    configuring one or more minimum blanking ratios for the plurality of operating networks.

8. An apparatus in a central coordination node for coordinating resources among a plurality of operating networks that is communicatively connected to the central coordination node, comprising a processor and a memory, said memory containing instructions executable by said processor whereby said apparatus is operative to:
    receive blanking determination related information reported from the plurality of operating networks;
    determine a blanking pattern for at least one of the plurality of operating networks based at least on the blanking determination related information; and
    distribute the blanking pattern to the at least one of the plurality of operating networks;
    wherein:
    the apparatus operative to determine a blanking pattern at least comprises determining a blanking ratio and blanking positions for the blanking pattern;
    the blanking determination related information at least comprises:
        a blanking ratio budget estimated at an operating network; and
        one or more blanking ratio requests estimated by the operating network for one or more peer operating networks that interfere with that operating network; and
    the apparatus operative to determine a blanking ratio comprises, for an operating network, the apparatus operative to determine the blanking ratio based on a comparison between its estimated blanking ratio budget and one or more blanking ratio requests estimated for it.

9. The apparatus according to claim 8, wherein said apparatus operative to determine the blanking ratio based on the comparison further comprises:
    for an operating network, if its estimated blanking ratio budget is not less than any of the blanking ratio requests estimated for it, then determining a maximum one of the blanking ratio requests estimated for it as the blanking ratio of that operating network; or for an operating network, if any of the blanking ratio requests estimated for it is greater than its estimated blanking ratio budget, then adjusting at least one of that greater blanking ratio request and the estimated blanking ratio budget such that no blanking ratio request is greater than the estimated blanking ratio budget after the adjusting.

10. The apparatus according to claim 9, wherein said apparatus operative to adjust comprises:
said apparatus operative to adjust at least one of the estimated blanking ratio budget and the greater blanking ratio request, based on a comparison between an average blanking ratio over a previous certain time period of the operating network that reports the greater blanking ratio request and an average blanking ratio over the previous certain time period of the operating network that has the estimated blanking ratio budget less than the greater blanking ratio request.

11. The apparatus according to claim 9, wherein said apparatus operative to adjust further comprises:
if the average blanking ratio of the operating network that reports the greater blanking ratio request is greater than the average blanking ratio of the operating network that has the estimated blanking ratio budget less than the greater blanking ratio request, then
increasing the estimated blanking ratio budget to the greater blanking ratio request; otherwise, decreasing the greater blanking ratio request to the estimated blanking ratio budget; or
adjusting both the greater blanking ratio request and the estimated blanking ratio budget to a value that is greater than an average of the greater blanking ratio request and the estimated blanking ratio budget and less than the greater blanking ratio request; otherwise adjusting both the greater blanking ratio request and the estimated blanking ratio budget to a value that is greater than the estimated blanking ratio budget and less than the average of the greater blanking ratio request and the estimated blanking ratio budget.

12. The apparatus according to claim 8, said determining blanking positions comprises at least causing blanking positions of two operating networks that interfere with each other to be different.

13. The apparatus according to claim 8, further comprising said apparatus operative to:
configure one or more minimum blanking ratios for the plurality of operating networks.

14. An apparatus in an operating network for resource coordination with a plurality of peer operating networks, comprising a processor and a memory, said memory containing instructions executable by said processor whereby said apparatus is operative to:
obtain blanking determination related information;
report the blanking determination related information to a central coordination node; and
schedule resources according to a blanking pattern distributed from the central coordination node that is determined based at least on the blanking determination related information;
wherein the apparatus operative to obtain blanking determination related information at least comprises the apparatus operative to:
estimate a blanking ratio budget for the operating network; and
estimate one or more blanking ratio requests for the peer operating networks that interfere with the operating network; and
wherein the apparatus operative to report the blanking determination related information further comprises the apparatus operative to:
report the estimated blanking ratio budget along with an identification of the operating network; and
report the estimated one or more blanking ratio requests along with identifications of corresponding peer operating networks.

15. The apparatus according to claim 14, wherein said blanking determination related information is obtained based at least on an operating condition of the operating network.

* * * * *